K. A. SIMMON & A. J. HALL.
CONTROL SYSTEM.
APPLICATION FILED JAN. 23, 1915.

1,291,204.

Patented Jan. 14, 1919.
3 SHEETS—SHEET 2.

WITNESSES:
Fred. A. Lind
D. H. Mace

INVENTORS
Karl A. Simmon &
Arthur J. Hall
BY
Wesley G. Carr
ATTORNEY

UNITED STATES PATENT OFFICE.

KARL A. SIMMON, OF EDGEWOOD PARK, AND ARTHUR J. HALL, OF WILKINSBURG, PENNSYLVANIA, ASSIGNORS TO WESTINGHOUSE ELECTRIC AND MANUFACTURING COMPANY, A CORPORATION OF PENNSYLVANIA.

CONTROL SYSTEM.

1,291,204.  Specification of Letters Patent.  Patented Jan. 14, 1919.

Application filed January 23, 1915. Serial No. 3,932.

*To all whom it may concern:*

Be it known that we, KARL A. SIMMON, a citizen of the United States, and a resident of Edgewood Park, in the county of Allegheny and State of Pennsylvania, and ARTHUR J. HALL, a subject of the King of Great Britain, and a resident of Wilkinsburg, in the county of Allegheny and State of Pennsylvania, have invented a new and useful Improvement in Control Systems, of which the following is a specification.

Our invention relates to control systems for dynamo-electric machines, and has special reference to systems for controlling the operation of electric locomotives or other railway vehicles that are propelled through the agency of polyphase induction motors which are governed by means of liquid rheostats.

One of the objects of our invention is to simplify and improve the arrangement of circuits and mode of operation of systems of the above-indicated character, and to provide a multiple-unit system of this type by means of which the several driving motors may be connected for different ranges of operating speeds and may be governed by a single master controller.

Another object of our invention is to provide a control system of this general class embodying a plurality of polyphase induction motors that may be adapted for different number of poles and for either cascade or parallel operation by means of a plurality of speed-changing switches, and, moreover, to provide a single master controller for governing the operation of the speed-changing switches, whereby the motor connections are established for different ranges of operating speeds and also for governing the operation of the motors by means of liquid rheostats during periods of both acceleration and regeneration.

A still further object of our invention is to provide a system of control by means of which a single master controller is not only adapted to effect the desired motor-circuit connections for different ranges of speed and to govern the motor operation for each range of speed, but it is also adapted to provide a step-by-step control of the motor-governing liquid rheostats whereby the level of the electrolyte therein may be established at any of a plurality of heights in accordance with the position of the master controller.

It is also an object of our invention to provide a system of control of the type under consideration which shall be adapted for a plurality of ranges of operating speeds and which shall embody a single master controller for governing the operation of the speed-changing switches and the liquid rheostats for a less number of speed ranges than that for which the system is adapted, and, moreover, to provide an auxiliary selective switch by means of which the particular speed ranges which the master controller is adapted to govern, may be selected as desired.

In a copending application, Serial No. 860,607, filed September 8, 1914, by A. J. Hall and assigned to the Westinghouse Electric & Manufacturing Company, a somewhat similar system of control is disclosed which, however, embodies a plurality of master controllers, one of which functions to govern the operation of the speed-changing switches to establish the several motor connections for the different speed ranges, and the other is adapted to govern the operation of the motors through the agency of the liquid rheostats.

According to our present invention, we propose to combine the functions of the two master controllers, just referred to, in such manner that a single master controller may be employed which is adapted to be moved in one direction through its several operative positions to successively establish the different motor-circuit connections and to provide a plurality of rheostat-regulating steps for each motor arrangement or speed range.

Our invention may best be understood by reference to the accompanying drawings, in which.

We shall first set forth the main-circuit connections and apparatus and the general mode of operation thereof, after which the control-circuit connections and operation will be discussed.

Figures 1, 2:
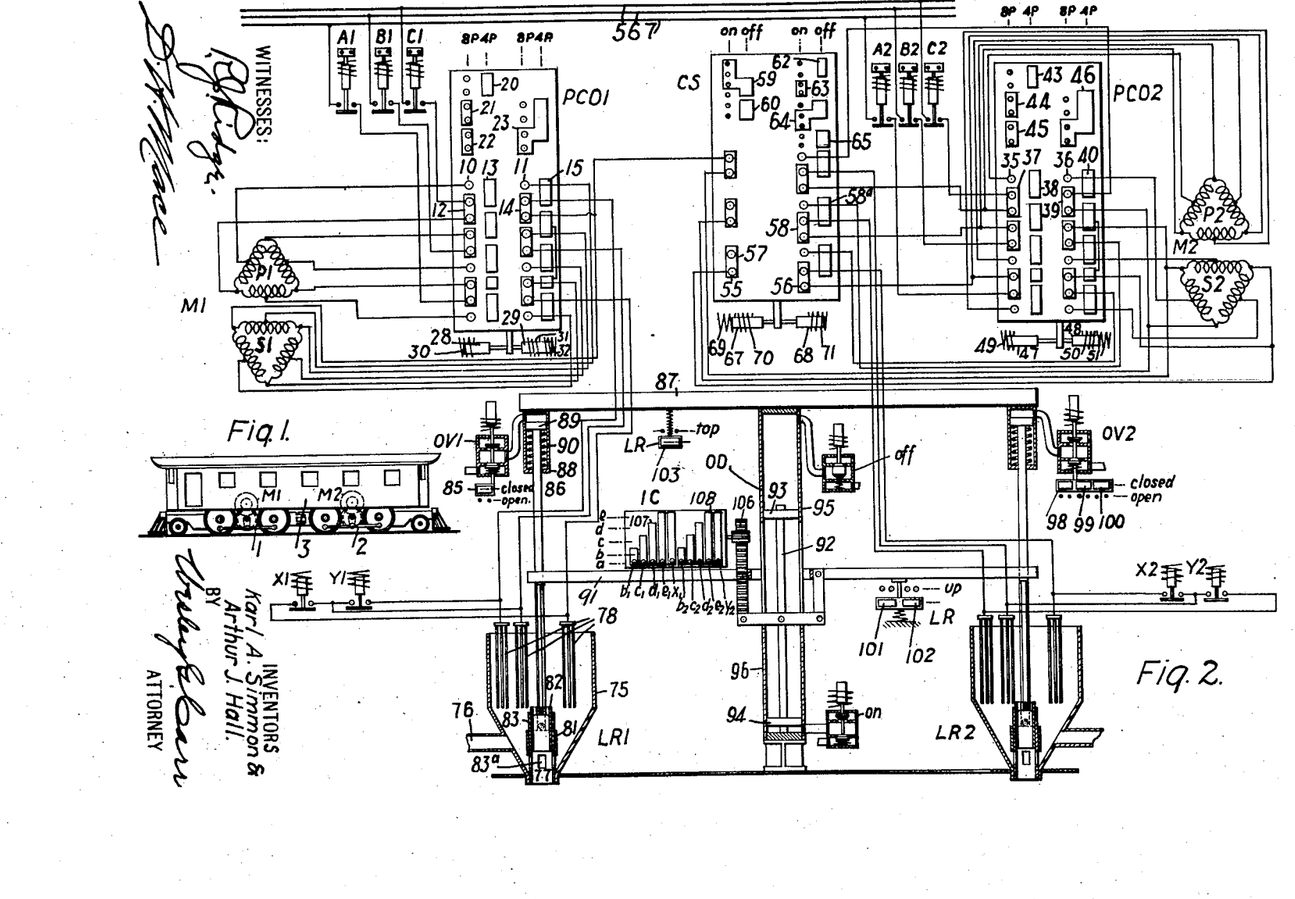
Figure 1 is a view, in side elevation, of an electric locomotive for the control of which our system is adapted.
Fig. 2 is a diagrammatic view of a system of control embodying our invention, the main circuit connections and apparatus and the control switches which are directly associated therewith being shown completely, while the control circuits are omitted for the sake of clearness.

Referring to the drawings, the system shown is adapted for the control of a plurality of driving motors M1 and M2 that may be respectively associated with a plurality of driving trucks 1 and 2 of an electric locomotive 3 and which, of course, is applicable to different arrangements of motors, irrespective of the class of vehicles with which they are associated. The system comprises a plurality of supply-circuit conductors 5, 6 and 7 which are adapted to deliver polyphase alternating energy to the polyphase induction motors M1 and M2; a plurality of line switches A1, B1, and C1 for connecting the supply conductors 5, 6 and 7 to motor M1; a plurality of line switches A2, B2 and C2 interposed between the supply-circuit conductors and the motor M2; pole change-over switches PCO1 and PCO2 for arranging the winding connections of the motors M1 and M2 for different numbers of poles; a cascade switch CS for connecting motors M1 and M2, either in cascade relation or in parallel circuit relation; a plurality of liquid rheostats LR1 and LR2 adapted to be connected in the secondary circuits of the motors M1 and M2 for governing the acceleration and operation thereof; an operating device OD for actuating the liquid rheostats LR1 and LR2; an interlock controller IC actuated by the device OD, a plurality of switches X1 and Y1 for short-circuiting rheostat LR1, and switches X2 and Y2 for establishing short-circuit connections for liquid rheostat LR2.

The motors M1 and M2 are of the three-phase wound-rotor induction type and respectively embody primary windings P1 and P2 and secondary windings S1 and S2. Initially, the windings are connected in delta relation, and the external connections are made to the points of common connection, under which conditions, the motors are adapted for a particular number of poles, for instance, eight poles, while the windings are provided with taps at substantially their mid-points, by means of which the number of poles of the motors may be halved, if desired, thereby producing four-pole machines. Inasmuch as these connections for adapting motors of this type for different numbers of poles are well-known, no further description thereof is deemed necessary.

The pole change-over switch PCO1 comprises a plurality of sets of main stationary contact terminals 10 and 11 and coöperating sets 12, 13, 14 and 15 of movable contact segments which are adapted to make engagement therewith upon the position-indicating lines 8P and 4P, the change-over switch being adapted to occupy two positions, one for arranging the motor M1 for eight poles and the other for four poles. The switch PCO1 embodies also a plurality of interlocking switches 20, 21, 22, 23, which comprises coöperating relatively movable contact terminals that are also adapted for engagement upon the position-indicating lines, hereinbefore referred to.

Each of the several interlock switches will be designated by a single reference numeral which indicates the movable conducting segment thereof, and, for the sake of clearness, said switches will be hereinafter referred to by their numerals, with the reference character of the main switch with which they are associated and by the position of said switch in which engagement between the coöperating members is effected. For instance, 23—PCO1—8P indicates that conducting segment 23 of pole change-over switch PCO1 engages its stationary contact terminals when said change-over switch occupies its position 8P.

The switch PCO1 is adapted to be electrically operated by means of electromagnets 28 and 29, electromagnet 28 being provided with a single energizing coil 30—PCO1—4P, and magnet 29 with a plurality of coils 31—PCO1—8P and 32—PCO1—8P.

The pole change-over switch PCO2 is similar in construction to switch PCO1 and embodies a plurality of sets of main stationary contact terminals 35 and 36, coöperating sets 37, 38, 39 and 40 of movable conducting segments, a plurality of interlock switches 43, 44, 45 and 46, and a plurality of operating electromagnets 47 and 48, which, respectively, are provided with energizing coils 49—PCO2—4P; 50—PCO2—8P and 51—PCO2—8P.

The cascade switch CS is also of similar construction to those just described and embodies a plurality of sets 55 and 56 of main stationary contact terminals, sets 57, 58 and 58ª of coöperating movable segments, a plurality of interlock switches 59, 60, 62, 63, 64 and 65 and electromagnets 67 and 68, respectively, provided with energizing coils 69—CS—off, 70—CS—off and 71—CS—on.

The liquid rheostat LR1 comprises a tank 75 having an inlet opening 76 through which electrolyte continuously flows, a discharge opening 77 and a plurality of electrodes 78. Associated with the discharge opening 77 are a plurality of concentrically related valves 81 and 82. The discharge valve 81 surrounds a tubular member 83 which is secured to the inner edges of the discharge opening 77 and is provided with a plurality of openings $83^a$ near its lower end, and said discharge valve 81 is adapted to be moved downwardly to close said openings $83^a$. The valve 82 is the regulating valve and is slidably fitted within the tube 83 and is adapted to be raised or lowered to affect the height of the electrolyte within the rheostat, it being understood that the electrolyte is being continuously admitted into the rheostat and that the excess thereof, when the discharge valve is closed, overflows through said regulating valve 82 and the discharge opening 77. The discharge valve 81 is mechanically associated with a pneumatic operating device 86 which is conveniently supported by a member 87.

The operating device 86 comprises a cylinder 88 containing a movable piston 89 which is normally held in its upper position by a spring 90. An electrically operated outlet valve OV1 governs the admission of fluid thereto from a suitable source (not shown) and is provided with an interlock switch 85. The valve OV1, when deënergized, is closed and cuts off the supply of operating fluid while establishing a communication between the cylinder 86 and the atmosphere, whereby its associated discharge valve 81 is held open.

Since the liquid rheostat LR2 is similar in all respects to the rheostat LR1, no description thereof will be given. The associated outlet valve OV2 is adapted to control the actuation of the discharge valve 81 of rheostat LR2, in the same manner as set forth in connection with rheostat LR1, and is provided with interlock switches 98, 99 and 100.

The regulating valves 82 of rheostats LR1 and LR2 are mechanically associated with the operating device OD, being connected to the ends of a common supporting member or arm 91 that is associated with a piston rod 92 having end pistons 93 and 94, which are movable within a plurality of operating cylinders 95 and 96, respectively. The lower end of operating cylinder 96 is provided with an electrically operated valve marked "On" which, when deënergized, establishes communication between the cylinder 96 and the atmosphere and, when energized, admits operating fluid thereto. An electrically operated valve marked "Off" is connected to the upper end of cylinder 95 and, when deënergized, is open to admit operating fluid into said cylinder. Under normal operating conditions, therefore, when both the "on" and "off" magnet valves are deënergized, pressure is released beneath the piston 94 and is admitted above the piston 93, whereby the regulating valves 82 of the several rheostats LR1 and LR2 are biased to, and maintained in, their lowest positions. When both magnet valves are energized, the reverse conditions are obtained, and the regulating valves 82 are moved upwardly. When only the "on" magnet valve is energized, balanced pressures are obtained on the opposite sides of the pistons 93 and 94, and the mechanism is maintained at rest. The operating device OD, as a whole, is termed a "balance-pressure operating device."

Associated with the operating device OD, are a plurality of interlock switches 101—LR—up and 102—LR—up to coöperate with the cross arm 91 which operates the regulating valves 82, and said interlock switches are normally opened when the regulating valves 82 and the arm 91 are in their lowest positions and are subsequently closed by suitable means as soon as the cross arm 91 is initially raised. Another auxiliary interlock switch 103—LR—top is associated with the operating device OD and is arranged to be closed only when the cross arm 91 and associated regulating valves 82 are raised to their uppermost or top positions.

Moreover, the auxiliary interlock controller IC is operatively connected to the movable piston rod 92 of the device OD by means of a rack and pinion connection 106, whereby it is actuated in accordance with the movements of the operating device OD. A plurality of stationary contact terminals $b_1$, $c_1$, $d_1$, $e_1$, $x_1$, and $b_2$, $c_2$, $d_2$, $e_2$, and $y_2$, are associated with the controller IC and are adapted to coöperatively engage conducting segments 107 and 108 in the operative positions $a$, $b$, $c$, $d$ and $e$ thereof.

The interlock switches associated with the outlet valves OV1 and OV2 are opened when their associated valves are deënergized and closed when their respective valves are energized and opened. Hereinafter, the several interlock switches referred to will be designated by their reference numerals, together with the valve with which they are associated and the position of the valve in which the switch is closed, as, for instance, interlock switch 100—OV2—open.

Having set forth the arrangement of apparatus and the structural details thereof, I shall now describe, in a general way, the main-circuit connections and apparatus, irrespective of the manner in which said apparatus is actuated and controlled.

Assuming the main circuit connections to be as shown in Fig. 2, the motors M1 and M2 are connected in cascade arrangement, with the secondary windings S2 of motor M2 connected to the secondary windings S1 of motor M1 and the primary windings P2 of motor M2 connected to the rheostat LR2. Moreover, the windings of the several motors are connected for their larger number of poles, namely, eight poles, and hence, this cascade arrangement gives the equivalent of a sixteen-pole machine, so far as the speed of operation is concerned. This constitutes the lowest-speed connection, which, it will be assumed, is adapted to produce a speed of approximately seven miles per hour.

Figures 3, 4, 5, 6:
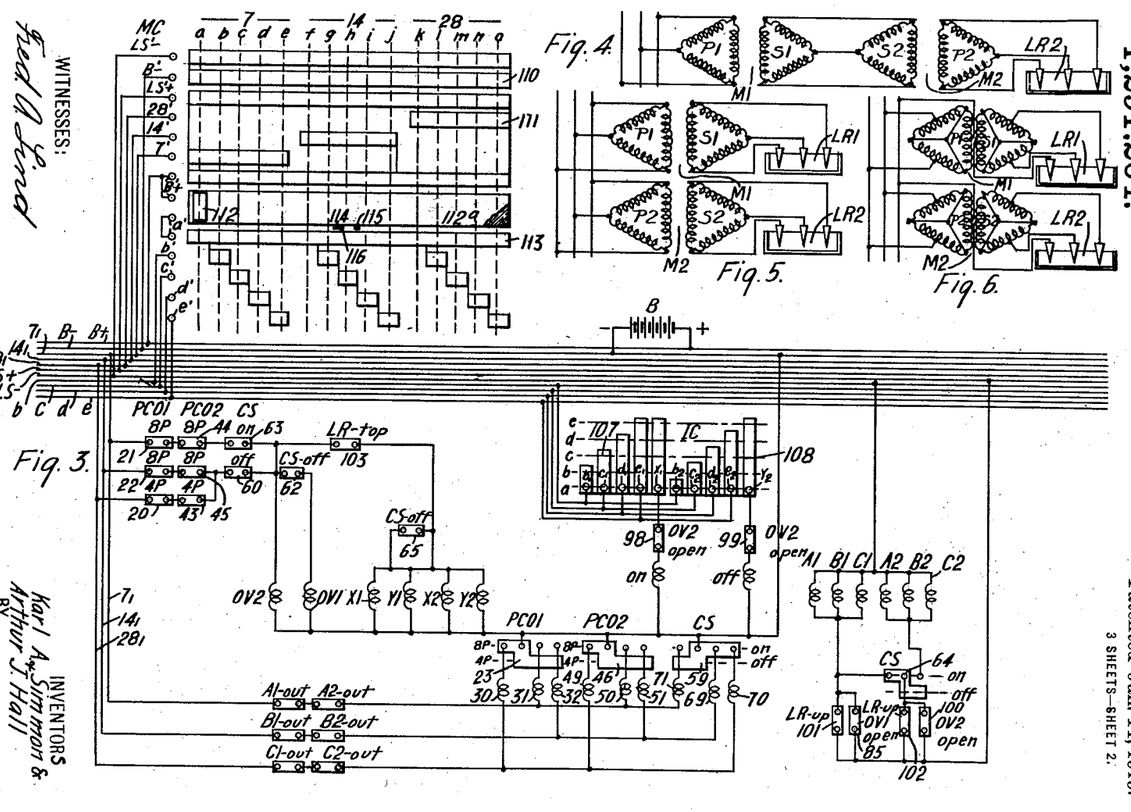
Fig. 3 is a diagrammatic view of the auxiliary control-circuit connections and control apparatus, including the energizing coils and auxiliary interlocking switches shown in Fig. 2. The interlocking switches are distributed throughout the diagram for simplification and clearness in lieu of being indicated in connection with the apparatus with which they are actually associated and by which they are actuated.
Figs. 4, 5 and 6 are simplified diagrammatic views showing the arrangement of main-circuit connections of the motors for three different ranges of speeds.

Having established the cascade connections of motors M1 and M2, outlet valve OV2 is energized to effect the closure of the discharge valve 81 of rheostat LR2, under which condition the continuous flow of electrolyte into the rheostat raises the height thereof to the "flush level", at which height the electrodes 78 are partially immersed and the excess of electrolyte overflows. Subsequent to the action of the outlet valve OV2 and before the "flush level" is established, the line switches A1, B1 and C1 are closed to connect the supply-line conductors 5, 6 and 7 to the primary windings P1 of motor M1. The motor-circuit connections are then as shown in Fig. 4.

The source of energy being thus connected to the motors, said motors are started into operation and may be accelerated by gradually raising the level of the electrolyte within the rheostat LR2, whereby the resistance in the secondary windings S2 of motor M2 is gradually excluded. The elevation of the electrolyte is, of course, effected by raising the regulating valve 82 through the balanced-pressure operating device OD, it being understood that said device is caused to actuate said valve by energizing the "off" and the "on" magnet valves, whereby operating fluid is admitted beneath piston 94 and released above piston 93. The movement of the valve 82, and hence motor acceleration, may be arrested by deënergizing the "off" valve, whereby balanced pressures, acting upon the pistons 93 and 94, are obtained.

Having raised the electrolyte to its maximum height, all the resistance is excluded from the secondary circuit of motor M2, and the short-circuiting switches X2 and Y2 are closed. The full-speed operation for this particular connection of motors is thus obtained, namely seven miles per hour, and this is the first running position of the motors.

In order to increase the motor speed, the valve OV2 is deënergized to permit the opening of the discharge valve 81 of the rheostat LR2. The "off" and "on" magnet valves are also deënergized to permit the balanced-pressure operating device OD and its associated regulating valves to be lowered to their initial positions, whereby the liquid rheostat LR2 serves to interrupt the motor circuit, after which line switches A1, B1 and C1 are opened.

Maintaining the pole change-over switches PCO1 and PCO2 in the same positions, the cascade switch CS is moved to its "off" position, whereby the motors M1 and M2 are connected in parallel and arranged for their larger number of poles, namely, eight poles. The outlet valves OV1 and OV2 are then energized to effect the closure of the discharge valves 81 of the rheostats LR1 and LR2, whereby the "flush levels" of the electrolyte are established. Prior thereto, however, line switches A1, B1 and C1 and A2, B2 and C2 are closed. Thus, energy is supplied to the motors M1 and M2, which are connected in parallel and independently to rheostats LR1 and LR2, the motor circuit connections being as shown in Fig. 5.

To increase the motor speed, the operating device OD is actuated to raise the regulating valves 82, whereby the electrolyte level is increased and the motor secondary resistances correspondingly decreased until the maximum height of the electrolyte is reached, when the short-circuiting switches X1, Y1 and X2 and Y2 are closed. The motors M1 and M2 are then connected in multiple to the supply circuit, with their larger number of poles, namely, eight poles. This is the second running position of the motors, and the speed thereof is substantially double that of the first arrangement of motor-circuit connections, namely, fourteen miles per hour.

A still further range of operating speeds may be obtained by again emptying the rheostats LR1 and LR2 of electrolyte and subsequently opening the several line switches, as hereinbefore described, after which the pole change-over switches PCO1 and PCO2 are moved into their four-pole positions 4P, whereby the windings of motors M1 and M2 are re-arranged to halve the number of poles, thus producing four-pole machines. The cascade switch CS remains in its "off" position, whereby multiple arrangement of the motors M1 and M2 is maintained.

Subsequent to arranging the motors for multiple operation and four-pole windings, the outlet valves OV1 and OV2 and the line switches A1, B1, C1 and A2, B2 and C2 are actuated in the manner already set forth. The motor connections are then as shown in Fig. 6. Energy is thus supplied to the motors M1 and M2, and they may be brought up to speed by raising the level of the electrolyte within the rheostats LR1 and LR2 until the maximum heights are reached, when the short-circuit switches X1, Y1 and X2 and Y2 are closed. Under these conditions, the motors M1 and M2 are connected in multiple arrangement with four-poles, each with all their secondary resistance excluded. This is the third or full running-speed condition and is adapted to effect a speed of twenty-eight miles per hour.

It will be seen, therefore, that the motors may be arranged for three ranges of operating speeds; first, from zero to seven miles an hour, with eight-pole windings and cascade arrangement; second, from seven to fourteen miles an hour, with eight-pole windings and multiple arrangement; and third, from fourteen to twenty-eight miles an hour, with four-pole windings and multiple arrangement.

Having considered, in a general way, the main motor-circuit connections and the mode of operation, reference may be had particularly to Fig. 3, showing the auxiliary control-circuit connections, which will now be discussed.

Among the control apparatus is a master controller MC which is adapted to control the operation of the several speed-changing switches PCO1, PCO2 and CS for effecting the motor connections for several ranges of operating speed and also for governing the movements of the operating device OD, whereby the liquid rheostats LR1 and LR2 are caused to govern the operation of the motors during each speed range.

The master controller MC comprises a plurality of stationary contact terminals LS′—, B′—, LS′+, 28′, 14′, 7′, B′+, $a'$, $b'$, $c'$, $d'$ and $e'$ which are adapted to coöperatively engage a plurality of movable conducting segments 110, 111, 112 and 113 on the position-indicating lines $a$ to $o$, inclusive. The several steps of the controller MC are divided into three groups —7—, —14— and —28—, and these groups are adapted to govern the operation of the speed-changing switches and liquid rheostats for the several ranges of operating speed.

The conducting segment 112 is mounted upon a ring or carrier 112$^a$ of insulating material that is movably associated with the drum of the controller by means of a friction clutch or similar connection, in a manner that is old in the art. The ring 112$^a$ is provided with a plurality of projections 114 and 115 that are spaced apart and are adapted to engage a stationary pin 116 which limits the movement of the carrier in either direction of operation. The arrangement of parts is such that, when the controller MC is moved into its position $a$, the friction-clutch connection serves to move the carrier 112$^a$ and associated conducting segment 112 until said segment engages the stationary contact terminals B′+ and $a'$, in which position the stop 116 engages the projection 115 and holds the carrier against further movement so long as the master controller is moved in a forward direction. Obviously, whenever the controller is moved backward from any of its operative positions, the disengagement of the conducting segment 112 and the terminals B′+ and $a'$ is effected as soon as the stop 116 is brought into engagement with the projection 114.

In order to adapt the system for multiple-unit train operation, a plurality of train-line conductors B+, B—, $7_1$, $14_1$, $28_1$, LS+, LS—, $b$, $c$, $d$, and $e$ are provided and are severally electrically connected to the contact terminals of the master controller MC bearing corresponding reference characters.

Assuming the apparatus and circuit connections to be as shown in Figs. 2 and 3, the operation of the system is as follows:

The master controller MC is first moved into its position $a$ in which a circuit is completed from the positive side of a battery B through train-line conductor B+, contact terminal B′+, conducting segment 111, contact terminal 7′, train-line conductor $7_1$ and, providing the several pole change-over switches and cascade switch occupy their proper positions for effecting a cascade arrangement of motors connected for 8 pole operation, the circuit is completed through interlock switches 21—PCO1—8P, 44—PCO2—8P, 63—CS—on, and thence, through the energizing coil of the outlet valve OV2 to the negative side of battery B. The outlet valve OV2, being thus energized, is actuated to effect the closure of discharge valve 81 of liquid rheostat LR2, and, in so doing, its associated interlock switch 100—OV2—open, is closed. Thus, a circuit is completed from train-line conductor B+ which includes contact terminals B′+, conducting segment 111, contact terminal LS′+, train-line conductor LS+, interlock switch 100—OV2—open, interlock switch 64—CS—on, and the energizing coils of line switches A1, B1 and C1 to the train-line conductor LS—, whence the circuit is completed through contact terminal LS′—, and conducting segment 110, contact terminal B′— to the B— train-line conductor. The energization of the coils of the line switches A1, B1, C1 effects their closure which connects the supply-circuit conductors 5, 6 and 7 to the primary windings P1 of the motor M1. It will be noted that the interlock switch 64—CS—on prevents the closure of the line switches A2, B2 and C2 during the cascade operation of the motors.

Having closed the discharge valve 81 of the rheostat LR2, the continuously flowing electrolyte rapidly rises in the rheostat until the tips of the electrodes 78 are immersed when the electrolyte is raised to the "flush level." The time interval required for establishing the "flush level" is sufficiently long to permit the closure of the line switches A1, B1, and C1. Hence, as soon as the electrolyte is brought into contact with the tips of electrodes 78, the motor-circuit connections for the first speed range are established.

In order to start the motor into operation, the master controller MC is moved into its position $b$, in which a circuit is established from the contact terminal B'+ which includes the slip segment 112, contact terminal $a'$, conducting segment 113, contact terminal $b'$, and train line conductor $b$, where the circuit divides, one branch traversing contact terminals $b_1$ and $x_1$ which are bridged by the conducting segment 107 of the interlock controller IC and thence through interlock switch 98—OV2—open and the energizing coil of magnet valve "on" to the B— conductor, the other branch including contact terminals $b_2$ and $y_2$ which are bridged by the conducting segment 108 of the interlock controller IC and thence, through interlock switch 99—OV2—open and the energizing coil of the magnet valve "off," to the train-line conductor B—.

Both of the magnet valves "on" and "off" of the operating device OD are thus energized and actuated into their opposite positions, whereby operating fluid is admitted beneath the lower piston 94 and is exhausted from above the upper piston 93. The resulting unbalanced pressures acting upon the pistons effect an upward movement thereof and of the associated regulating valve 82. Thus, the level of the electrolyte within the rheostat LR2 is raised until the interlock controller IC occupies its position $b$ in which the contact terminal $b_2$ disengages the conducting segment 108 and, hence, the "off" magnet valve is deënergized, whereupon said valve returns to its initial position to admit operating fluid above the piston 93 to establish balanced-pressure conditions and to arrest further movements of the regulating valve 82.

In order to increase the speed of the motors, the master controller MC may be moved into any one of its positions $c$, $d$ and $e$. For purposes of explanation, it will be assumed that the master controller is moved into its $e$ position, thereby completing a circuit from conducting segment 113, which includes contact terminals $e'$, train-line conductor $e$, where the circuit divides, one branch including contact terminals $e_1$ and $x_1$ that are bridged by conducting segment 107 of controller IC and, thence, through the energizing coil of the "on" magnet valve in the manner already set forth, while the other branch includes terminals $e_2$ and $y_2$ that are bridged by conducting segment 108 and thence through the energizing coil of the "off" magnet valve.

Under these conditions, both magnet valves "on" and "off" are again energized, and, therefore, an upward movement of the associated pistons 93 and 94 and regulating valve 82 of rheostat LR2 is effected until the uppermost position of said movable member is attained in which the contact terminal $e_2$ and conducting segment 108 are disengaged. The "off" magnet valve is thus deënergized and balanced pressures established, whereby further upward movements are prevented.

Just prior to the arm 91 of the operating device OD reaching its uppermost position, said arm engages interlock switch 103—LR— top and effects the closure thereof. Thereupon, a circuit is established from the negative side of the interlock switch 63—CS—on which includes interlock switch 103—LR— top and the energizing coils of the short-circuit switches X2 and Y2 to the B— conductor. These switches are, therefore, energized and closed to establish short-circuit connections between the several electrodes 78 of the rheostat LR2, while the interlock switch 65—CS—off prevents the actuation of the short-circuit switches X1 and Y1 during cascade operation.

From the foregoing description, it is clear that, having established the desired motor-circuit connections for the first range of operating speeds, the liquid rheostat LR2 may be operated either in a plurality of predetermined steps corresponding to the several positions of the master controller MC or it may be so governed as to continuously raise its electrolyte level to any predetermined height, as determined by the position of the master controller MC.

In order to further increase the motor speed, it is necessary to re-arrange the connections of the motors M1 and M2 and, hence, the master controller MC is moved into its position $f$ to effect the desired transition. During this movement, the contact terminal 7' becomes disengaged from the conductor segment 111, thereby deënergizing the outlet valve OV2 and short-circuiting switches X2 and Y2. Hence, the discharge valve 81 of the rheostat LR2 is opened to permit the discharge of electrolyte therethrough while the several interlock switches associated with the valve OV2 are caused to interrupt their control circuits.

The short-circuit switches X2 and Y2 are also opened. As the interlock switches 98—OV2—open, 99—OV2—open interrupt the energizing circuits of the magnet valves "on" and "off", said valves are deënergized and returned to their initial positions, whereby unbalanced pressures obtain within the cylinders 95 and 96 which act upon the movable parts of the operating device OD to return them and their associated regulating valve 82 to their lowermost position. During the lowering of the regulating valve 82, the interlock switch 102—LR—up is maintained closed until the operating device OD reaches substantially its lowermost position. Therefore, line switches A1, B1 and C1 are held closed until the interlock switch, just referred to, has been opened, by reason of the engagement of the arm 91 therewith in its lowest position.

Concurrently with the lowering of the operating device OD and regulating valve 82, the electrolyte within the rheostat LR2 is being rapidly discharged, which action is completed before the regulating valve is completely lowered and line switches A1, B1 and C1 opened. Therefore, interruption of the motor circuits is effected through the electrolyte within the rheostat LR2, and the line switches merely serve to subsequently disconnect the motors from the supply circuit.

As soon as the line switches are opened, a circuit is completed from the conducting segment 111, which includes contact terminal 14', train-line conductor $14_1$, interlock switches B1—out, and B2—out, energizing coil 69—CS—on, and interlock switch 59—CS—on, to the B— conductor. The cascade switch CS, therefore, is actuated to its off position, whereby the motors M1 and M2 are connected in multiple relation and the cascade arrangement thereof is discontinued. No changes are effected in the arrangement of motor windings and, therefore, the motors are still connected for 8-pole operation.

Upon the movement of the cascade switch CS into its off position, a circuit is completed from the train-line conductor $14_1$, through interlock switches 22—PCO1—8P, 45—PCO2—8P and 60—CS—off, and the energizing coil of outlet valve OV2 to the B— train-line conductor. The establishment of the circuit just traced, effects the closure of the valve OV2, whereby the discharge valve 81 of the rheostat LR2 is closed. The discharge valve of rheostat LR1 is also closed concurrently therewith, inasmuch as outlet valve OV1 is simultaneously energized through the 62—CS—off interlock switch.

The actuation of valves OV1 and OV2 causes the closure of interlock switches 85—OV1—open, and 100—OV2—open, whereby a divided circuit is completed from the train-line conductor LS+, one branch of which traverses interlock switch 85—OV1—open and energizing coils of switches A1, B1 and C1 to the B— conductor, the other branch traversing interlock switches 100—OV2—open and 64—CS—off and energizing coils of the line switches A2, B2 and C2 to the conductor B—. The several line switches A1, B1, C1 and A2, B2 and C2 are, therefore, energized and closed to connect the several motors M1 and M2 in parallel relation to the supply-circuit conductors 5, 6 and 7, as shown in Fig. 5. During the closure of the line switches, the continuously inflowing electrolyte establishes the "flush levels" and starts the motors M1 and M2 into operation.

The energization of the outlet valve OV2 effects the closure of the interlock switches 98—OV2—open and 99—OV2—open and, therefore, if the master controller MC be moved into its position $g$, the magnet valves "on" and "off" are both energized through circuits which have already been traced in connection with the operation of the system for the first speed range. It is deemed unnecessary to describe the circuit connections and the mode of operation of the system in connection with the regulation of the liquid rheostats LR1 and LR2 for the second range of operating speeds, inasmuch as the functioning of the apparatus is similar to that already described in connection with the cascade arrangement of motors.

Manifestly, by suitably manipulating the controller MC, the rise in the level of the electrolyte within the rheostats LR1 and LR2 and the acceleration of the motors M1 and M2 may be effected in a series of steps in accordance with the operation of the master controller by the operator.

Assuming, therefore, that the master controller MC occupies its position $j$ and that both of the liquid rheostats LR1 and LR2 have been completely filled with electrolyte, and their respective short-circuiting switches X1, Y1 and X2 and Y2 are closed, further increases in the motor speed may be effected by re-arranging the motor-circuit connections to secure parallel operation of the motors M1 and M2 with half the number of poles, or four poles. This arrangement of motor-circuit connections which provides for the last range of operating speeds is effected by moving the master controller MC to its $k$ position.

During this movement, contact terminal 14' becomes disengaged from the conducting segment 111, whereby the short-circuit switches X1, Y1 and X2, Y2 and the outlet valves OV1 and OV2 are deënergized and are caused to return to their initial positions. Moreover, the disengagement of conducting segment 113 from the contact terminals $a'$, $b'$, $d'$, $c'$, $e'$ effects the deënergization of the energizing coils of the "off" and "on" magnet valves, whereby the operating device OD and associated regulating valves 82 of the several rheostats are moved to their lowest positions, while the electrolyte within the rheostats is discharged through the opening of the discharge valves 81. The energizing circuits of the "on" and "off" valves are also interrupted through the opening of the interlock switches 98—OV2—open and 99—OV2—open.

The interruption of the motor-circuit connections during this transition is effected by the electrolyte within the rheostats, and, as soon as the regulating valves 82 reach their initial positions, the interlock switches 101—LR—up and 102—LR—up are disengaged and caused to deënergize the several line switches A1, B1, C1 and A2, B2 and C2 which open to disconnect the motors from the supply circuit.

Immediately following the opening of the line switches, and assuming the master controller to occupy its $k$ position, a circuit is established from the conducting segment 111, which includes contact terminal 28′, train-line conductor $28_1$, interlock switches C1—out and C2—out and, thence, in parallel circuits, one of which includes the energizing coil 30—PCO1—8P and interlock switch 23—PCO1—8P and the other through energizing coil 49—PCO2—8P and interlock switch 46—PCO2—$8p$ to the B— conductor. The change-over switches PCO1 and PCO2 are, therefore, actuated into their positions 4P, whereby the motor windings are re-connected and arranged for four poles. The cascade switch CS remains in its "off" position, so that the motors M1 and M2 are connected in multiple relation with four poles instead of eight poles.

As soon as the switches PCO1 and PCO2 occupy their 4P positions, a circuit is established from the train line conductor 28, which includes interlock switches 20—PCO1—4P, 43—PCO2—4P and 60—CS—off, and thence through the energizing coils of the outlet valves OV1 and OV2 in multiple to the B— conductor, the interlock switch 62—CS—off occupying its closed position to complete the circuit through the coil of the valve OV1.

The several discharge valves 81 of rheostats LR1 and LR2 are, therefore, closed and the electrolyte rises rapidly within the rheostats to establish the "flush levels".

When the outlet valves OV1 and OV2 are opened to close the discharge valves 81, their respective interlock switches close to effect the closure of the line switches A1, B1 and C1 and A2, B2 and C2 to establish the motor-circuit connections as shown in Fig. 6 for the third range of operating speeds.

The further regulation of the motor operation through the agency of the liquid rheostats LR1 and LR2 is similar to that already described in connection with the second speed range and is dependent entirely upon the manipulation of the master controller MC, as will be understood.

If the master controller MC be moved backward from any of its operative positions to another operative position in the same group of steps, the slip segment 112 is immediately disengaged from the contact terminals B′+ $a'$, whereby the energizing circuits of the magnet valves "on" and "off" are at once deënergized. Hence, the operating device OD and associated regulating valves 82 of the several rheostats are moved downwardly toward their lowest positions to effect the discharge of electrolyte until the "flush levels" are attained.

Obviously, no changes in the motor circuit connections are effected during its movement, inasmuch as the backard movement is assumed to cover only the steps of a single group. The normal operation may be resumed merely by moving the master controller MC in a forward direction to cause the slip segment 112 to again engage its coöperating contact terminals B′+ and $a'$, whence the magnet valves "on" and "off" are again deënergized.

If the motor speed, during the interval after the master controller is again moved forward to raise the level of the electrolyte within the rheostats, is in excess of the synchronous speed of the motors corresponding to the particular motor connections effected by the speed-changing switches, energy is regenerated for the supply circuits in accordance with the operation of the controller MC.

This system of control is particularly adapted for the utilization of the driving motors M1 and M2 as generators for the regeneration of energy, when the motors are driven by the inertia of the vehicle or locomotive. The regenerative action of the motors may be effected at any time when the speed thereof is grater than the normal speed of the motors corresponding to the particular arrangement of motor-circuit connections established.

If, therefore, the motors are running at substantially full speed, or 28 miles per hour, and the master controller occupies its position $o$, regeneration of energy may be effected by dropping back the controller to any of its lower positions and then again effecting its forward movement in order to decrease the motor secondary resistance by raising electrolyte level in the rheostats.

For purposes of further explanation, it will be assumed that the controller MC is moved backwardly to its position $g$. During this movement the contact terminal 28′ becomes disengaged from the conducting segment 111 and, therefore, outlet valves OV2 and OV1 are deënergized and caused to close, whereby the discharge valves 81 of the rheostats are opened to permit the discharge of electrolyte therefrom. Moreover, the "off" and "on" magnet valves are also deënergized by the disengagement of the slip segment 112, as hereinbefore set forth, and hence, the operating device OD and associated regulating valves 82 are forced downwardly to their initial positions whereupon the interlock switches 101—LR—up and 102—LR—up are actuated to interrupt the circuits of the line switches A1, B1, C1 and A2, B2 and C2. The motor-circuit connections, therefore, are interrupted through the discharging electrolyte in the rheostats, and the motors are subsequently disconnected from the source by the line switches.

The master controller MC, now occupying its $g$ position, contact terminal 14' is energized, and, consequently, the pole-change over switches PCO1 and PCO2 are actuated into their 8P positions. The cascade switch CS is not moved. Following the operation of the pole change-over switches, their associated interlock switches again establish energizing circuits through the outlet magnet valves OV2 and OV1 in the manner already set forth, whence the discharge valves 81 are closed and the "flush levels" reëstablished. Concurrently therewith, the line switches are also closed to connect the motors to the supply circuits, as shown in Fig. 5.

Assuming that the master controller MC is moved forward a sufficient amount to cause the engagement of the slip segment 112 with its contact terminals B'+ and $a'$, the "on" and "off" magnet valves are again energized, and the level of the electrolyte within the rheostats LR1 and LR2 is raised to a position corresponding to the position of the master controller MC. During this action, the motor secondary resistance is gradually eliminated from circuit and regeneration of energy for the supply circuit is effected until the speed of the motors has been reduced to substantially fourteen miles per hour.

Obviously, further regeneration of energy is rendered possible by returning the master controller MC to one of its first speed-range positions to establish the motor-circuit connections shown in Fig. 4, after which the regenerative operation may be governed in the manner already set forth in accordance with the will of the operator until the motor speed has been reduced to that corresponding to the synchronous speed of the motors for this particular motor connection.

Figure 7:
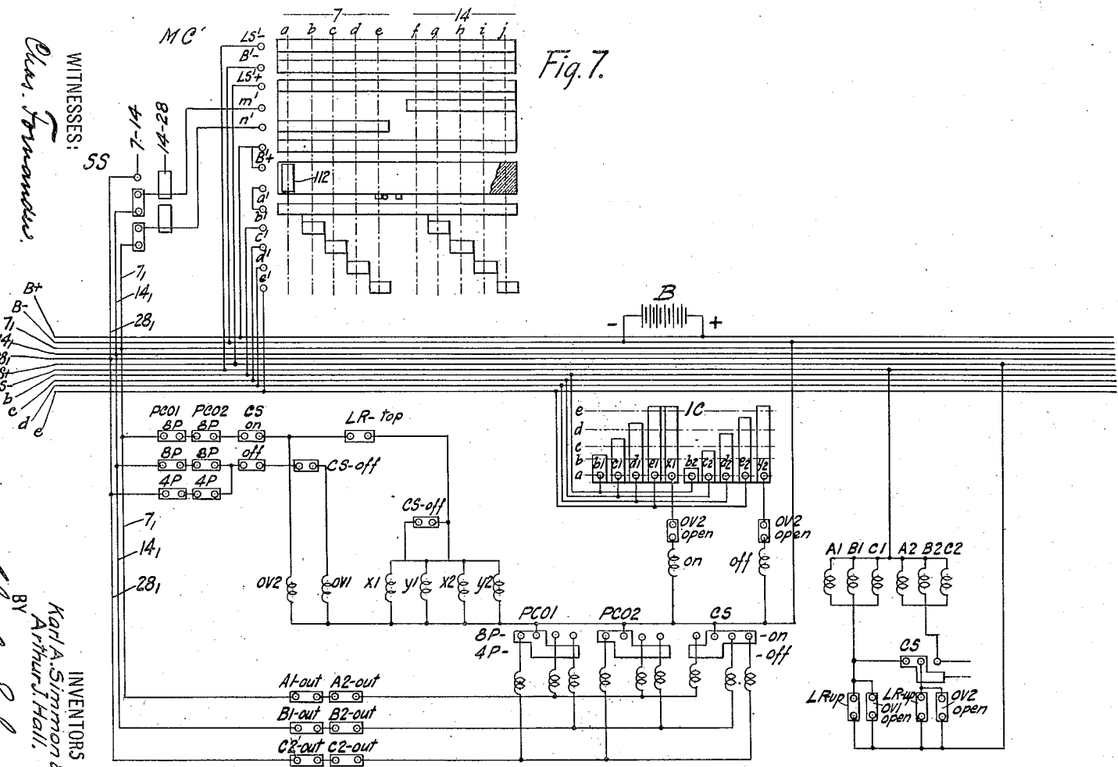
Fig. 7 is a view similar to Fig. 3 of a modified arrangement of control circuits embodying our invention.

Reference may now be had to Fig. 7 which illustrates a control system embodying a modified form of master controller which embodies our invention.

Inasmuch as the only differences in the system shown in Fig. 7 with respect to that shown in Fig. 3 reside in the construction and control-circuit connections of the master controller, only that portion of the system will be described in detail, it being believed that the mode of operation of this modified form of our invention may be readily understood without other description.

The master controller MC' is similar in construction to the controller MC of Fig. 3 with the exception that it is merely adapted to govern the operation of the speed-changing switches PCO1 and PCO2 and CS and the liquid rheostats LR1 and LR2 for two ranges of operating speeds instead of for three speed ranges.

In order to adapt the controller MC' for governing three ranges of operating speeds, an auxiliary selective switch SS is employed which is adapted to occupy two positions, one marked 7—14 in which the master controller MC' is adapted for controlling the operation during the first two speed ranges, that is, from zero to seven miles per hour, and from seven to fourteen miles per hour, and another position marked 14—28 which serves to adapt the master controller MC' for controlling the operation during the last two speed ranges, namely, from seven to fourteen miles per hour, and from fourteen to twenty-eight miles per hour.

In the position shown, the selective switch SS connects the contact terminals $m'$ and $n'$ of the master controller MC' to the train-line conductors $14_1$ and $7_1$, and, therefore, the operation of the system is identical with that already set forth in connection with Fig. 3 throughout the first two speed ranges. For certain characteristics of service, it may be found desirable to omit the lowest speed range and to provide for two higher ranges of speed, in which case the switch SS may be moved into its position 14—28, whereby the contact terminals $m'$ and $n'$ are respectively connected to the train-line conductors $28_1$ and $14_1$, the operation of the system then being similar to that hereinbefore described.

Obviously, many modifications may be effected in the arrangement and location of parts and in the circuit connections and mode of operation hereinbefore set forth without departing from the spirit and scope of our invention and we desire that only such limitations shall be imposed as are indicated in the appended claims.

We claim as our invention:

1. In a control system, the combination with a source of energy, a plurality of polyphase motors, a plurality of electrically controlled rheostats for governing the operation of said motors, and electrically controlled switching devices for arranging the motor connections for different ranges of speed, of a master controller for governing the operation of said liquid rheostats and said switching devices.

2. In a control system, the combination with a source of energy, a plurality of polyphase motors, a plurality of electrically controlled rheostats for governing the operation of said motors, and electrically controlled switching devices for arranging the motor connections for different ranges of speed, of a single master controller adapted to be moved through a plurality of steps to establish circuits for effecting the actuation of said switching devices and said rheostats.

3. In a control system, the combination with a source of energy, a plurality of polyphase motors, a plurality of electrically controlled rheostats for governing the operation of said motors, and electrically controlled switching devices for arranging the motor connections for different ranges of speed, of a single master controller for effecting the actuation of said switching devices for different ranges of speed and for effecting step-by-step operation of said rheostats for each arrangement of motor connections.

4. In a control system, the combination with a source of energy, a plurality of polyphase motors, a plurality of electrically controlled rheostats for governing the operation of said motors, and electrically controlled switching devices for arranging the motor connections for different ranges of speed, of single means for controlling the operation of said switching devices to effect the transitions in motor-circuit connections from one range of operating speed to another and for controlling the operation of said rheostats to effect the governing of the motor acceleration for each range of operating speed.

5. In a control system, the combination with a source of energy, a plurality of polyphase motors, a plurality of electrically controlled rheostats for governing the operation of said motors, and electrically controlled switching devices for arranging the motor connections for different ranges of speed, of a single master controller for governing the operation of said switching devices and said rheostats during periods of motor acceleration and motor regeneration.

6. In a control system, the combination with a source of energy, a plurality of polyphase motors, a plurality of electrically controlled rheostats for governing the operation of said motors, and electrically controlled switching devices for arranging the motor connections for different ranges of speed, of a single master controller for causing said switching devices to connect the motors for different speed ranges and for governing the operation of said rheostats for all speed ranges during periods of motor acceleration and motor regeneration.

7. In a control system, the combination with a source of energy, a plurality of polyphase motors, switching means for arranging said motors in cascade and in parallel relations for different ranges of operating speeds, and a plurality of rheostats for governing the operation of said motors, of a master controller embodying means for causing said switching means to arrange the connections of said motors and for governing the actuation of said rheostats for any arrangement of motor-circuit connections.

8. In a control system, the combination with a source of energy, a plurality of polyphase motors, electrically operated switching devices for connecting said motors for different numbers of poles and in cascade and in parallel relation whereby a plurality of ranges of operating speeds are obtained, and a plurality of electrically operated liquid rheostats for governing the operation of said motors, of a single master controller for causing said switching devices to connect said motors in cascade relation with one number of poles, in parallel relation with the same number of poles and in parallel relation with another number of poles and for governing the operation of said liquid rheostats for each arrangement of motor connections.

9. In a control system, the combination with a source of energy, a plurality of polyphase motors, electrically operated switching devices for connecting said motors for different numbers of poles and in parallel relation whereby a plurality of ranges of operating speeds are obtained, and a plurality of electrically operated liquid rheostats for governing the operation of said motors, of remote-control means embodying a single master controller for causing said switching devices to arrange the motor connections for different operating speed ranges and for effecting a step-by-step actuation of said liquid rheostats for each speed range.

10. In a control system, the combination with a source of energy, a plurality of polyphase motors, electrically operated switching devices for connecting the motors for different numbers of poles, an electrically operated switching device for arranging said motors in cascade and in parallel circuit relations, and a plurality of liquid rheostats for governing the operation of said motors, of a single master controller adapted, when operated in one direction, to cause said switching devices to successively connect said motors in cascade with one number of poles, in parallel with the same number of poles and in parallel with another number of poles and also to effect step-by-step movements of said rheostats for each arrangement of motors.

11. In a control system, the combination with a source of energy, a plurality of polyphase motors, a plurality of electrically controlled rheostats for governing the operation of said motors, and electrically controlled switching devices for arranging the motor connections for different ranges of speed, of a master controller embodying one portion for governing the actuation of said switching devices, another portion for governing the operation of said rheostats, and another portion for effecting the energization of said last mentioned portion when said controller is moved in a forward direction and for effecting the deënergization thereof when the controller is moved backward a predetermined amount.

12. In a control system, the combination with a source of energy, a plurality of polyphase motors, a plurality of electrically controlled rheostats for governing the operation of said motors, and electrically controlled switching devices for arranging the motor connections for different ranges of speed, of a master controller embodying one portion for governing the actuation of said switching devices, another portion for governing the operation of said rheostats, and a slip-segment portion for effecting the energization and deënergization of said last named portion in accordance with the direction of operation of said controller.

13. In a control system, the combination with a source of energy, a plurality of polyphase motors, a plurality of electrically controlled rheostats for governing the operation of said motors, and electrically controlled switching devices for arranging the motor connections for different ranges of speed, of a single master controller for causing said switching devices to arrange the motor circuits when moved in either direction of operation and for causing step-by-step operation of said rheostats for each arrangement of motor circuits when moved only in one direction.

14. In a system of control, the combination with a source of energy, a plurality of polyphase motors, a plurality of electrically controlled switching devices for connecting the motors for different ranges of operating speeds, and a plurality of electrically controlled rheostats for governing the operation of said motors, of a single master controller for governing the actuation of said switching devices and said rheostats, and a selective switch for determining the switching devices to be actuated.

15. In a system of control, the combination with a source of energy, a plurality of polyphase motors, a plurality of electrically controlled switching devices for connecting the motors for different ranges of operating speeds, and a plurality of electrically controlled rheostats for governing the operation of said motors, of a single master controller for governing the operation of said devices to effect the motor connections for different ranges of speeds and for governing the operation of said rheostats for each arrangement of motor connections, and auxiliary means for selecting the switching devices to be operated and therefore the speed ranges to be obtained.

16. In a system of control, the combination with a source of energy, a plurality of polyphase motors, a plurality of electrically controlled switching devices for connecting the motors for different ranges of operating speeds, and a plurality of electrically controlled rheostats for governing the operation of said motors, of a single master controller for governing the operation of said switching devices and said rheostats for a plurality of speed ranges less than the full number thereof, and auxiliary means for determining the particular speed ranges to be governed by the master controller.

17. In a system of control, the combination with a source of energy, a plurality of polyphase motors, a plurality of electrically controlled switching devices for connecting the motors in cascade and in parallel relation and the different numbers of poles whereby three ranges of operating speeds are obtained, and a plurality of electrically controlled liquid rheostats for governing the operation of the motors for each range of speed, of a master controller for governing the operation of said switching devices and said rheostats for two ranges of speed, and auxiliary means for selecting the particular ranges of speed to be governed by said master controller.

18. In a system of control, the combination with a source of energy, a plurality of polyphase motors, a plurality of electrically controlled switching devices for connecting the motors for three ranges of operating speeds, and a plurality of electrically controlled rheostats for governing the operation of said motors, of a single master controller for controlling the operation of said switching devices and said rheostats for two speed ranges, and other means for selecting the particular two speed ranges to be controlled by said controller.

19. In a control system, the combination with a source of energy, a plurality of dynamo-electric machines and a plurality of translating devices for governing the operation of said machines, of means for arranging the machine connections for a plurality of ranges of operating conditions, and a single means for governing the operation of said translating devices and said arranging means during both accelerating and regenerative operation of said machines and for effecting transition of the motors from accelerating to regenerative operation.

20. In a control system, the combination with a source of energy, a plurality of electric motors and a plurality of controllable resistance devices for governing the operation of said motors, of switching devices for arranging the motor connections for different ranges of speed, and a single controller for governing the operation of said resistance devices and said switching devices during periods of motor acceleration and motor regeneration and for effecting transition of the motors from accelerating to regenerative operation.

21. In a system of control, the combination with a source of energy, a plurality of dynamo-electric machines and a plurality of translating devices for governing the operation of said machines, of means for arranging the machine connections for three ranges of operating conditions, a single switching device for controlling the actuation of said arranging means and said translating devices for two operating ranges, and selective means for determining the particular two ranges to be controlled by said switching device.

In testimony whereof, we have hereunto subscribed our names this 18th day of January, 1915.

KARL A. SIMMON.
ARTHUR J. HALL.

Witnesses:
JOSH BIRRELL,
B. B. HINES.